Aug. 4, 1931. J. W. HUGHES 1,817,193
WHEEL WELDING MACHINE
Original Filed Jan. 30, 1928 3 Sheets-Sheet 1
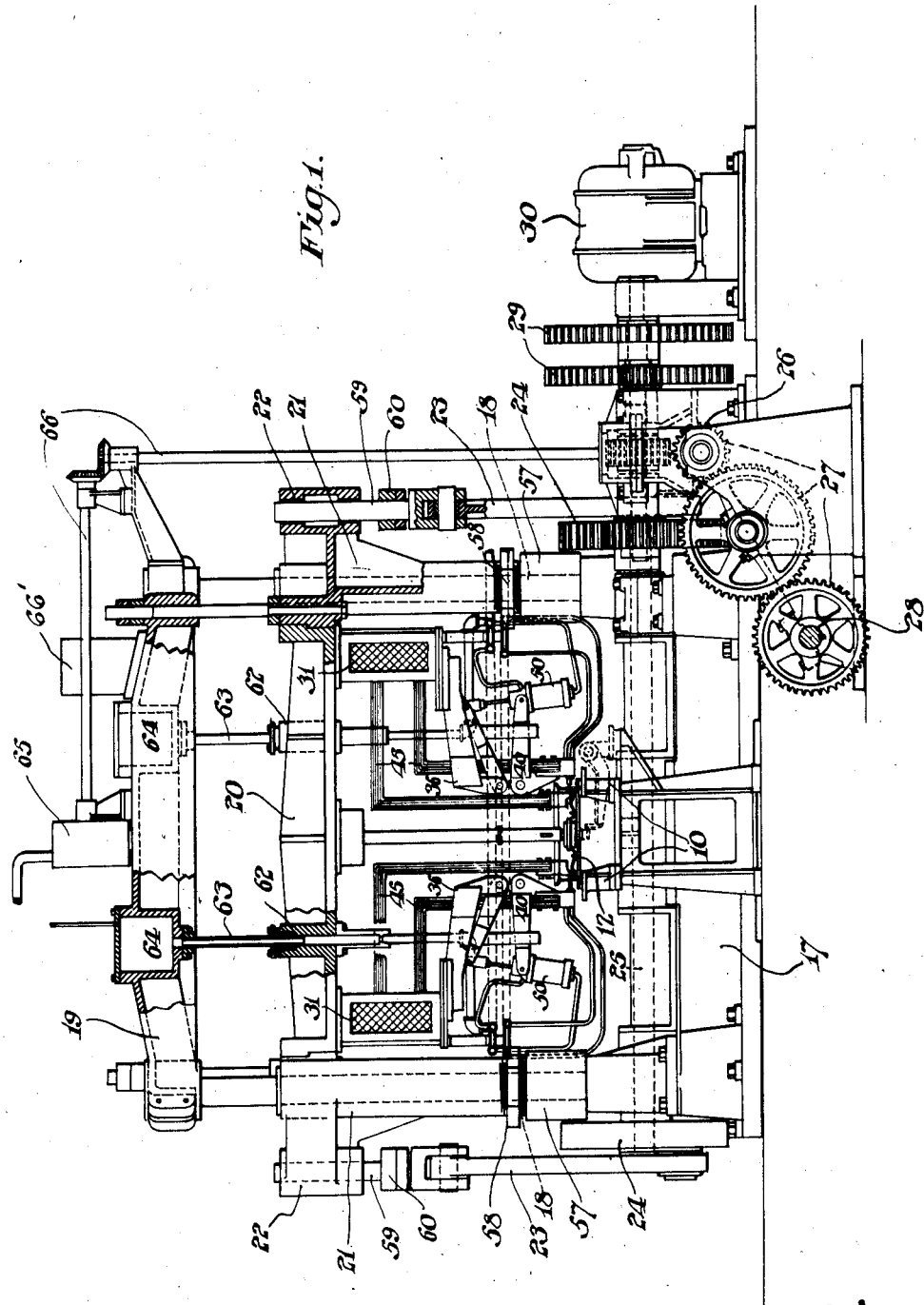
Inventor:
James W. Hughes,
By John P. Tarbox
Attorney.

Aug. 4, 1931. J. W. HUGHES 1,817,193
WHEEL WELDING MACHINE
Original Filed Jan. 30, 1928   3 Sheets-Sheet 2
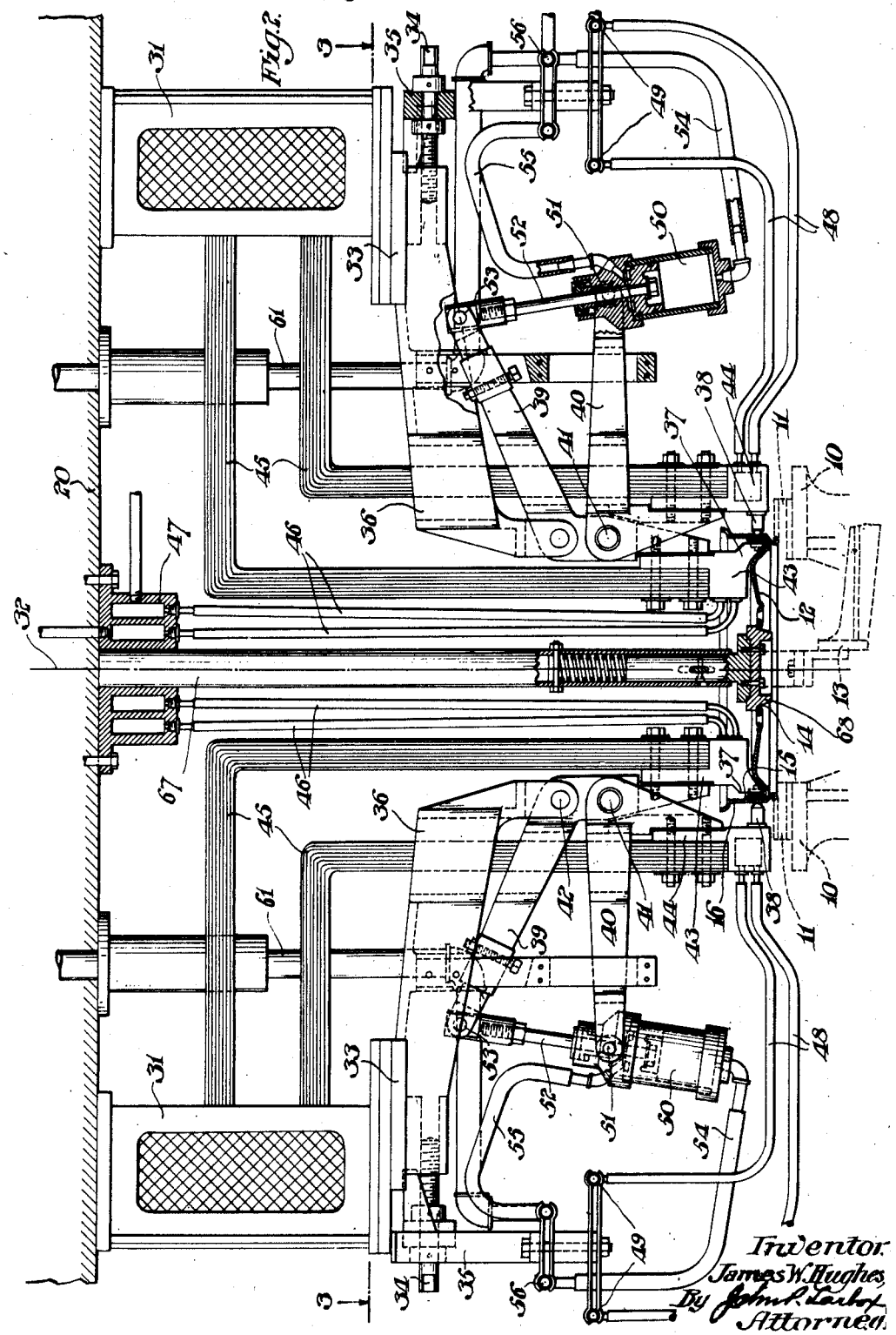
Inventor
James W. Hughes
By John P. Tarbox
Attorney Aug. 4, 1931.  J. W. HUGHES  1,817,193
WHEEL WELDING MACHINE
Original Filed Jan. 30, 1928   3 Sheets-Sheet 3
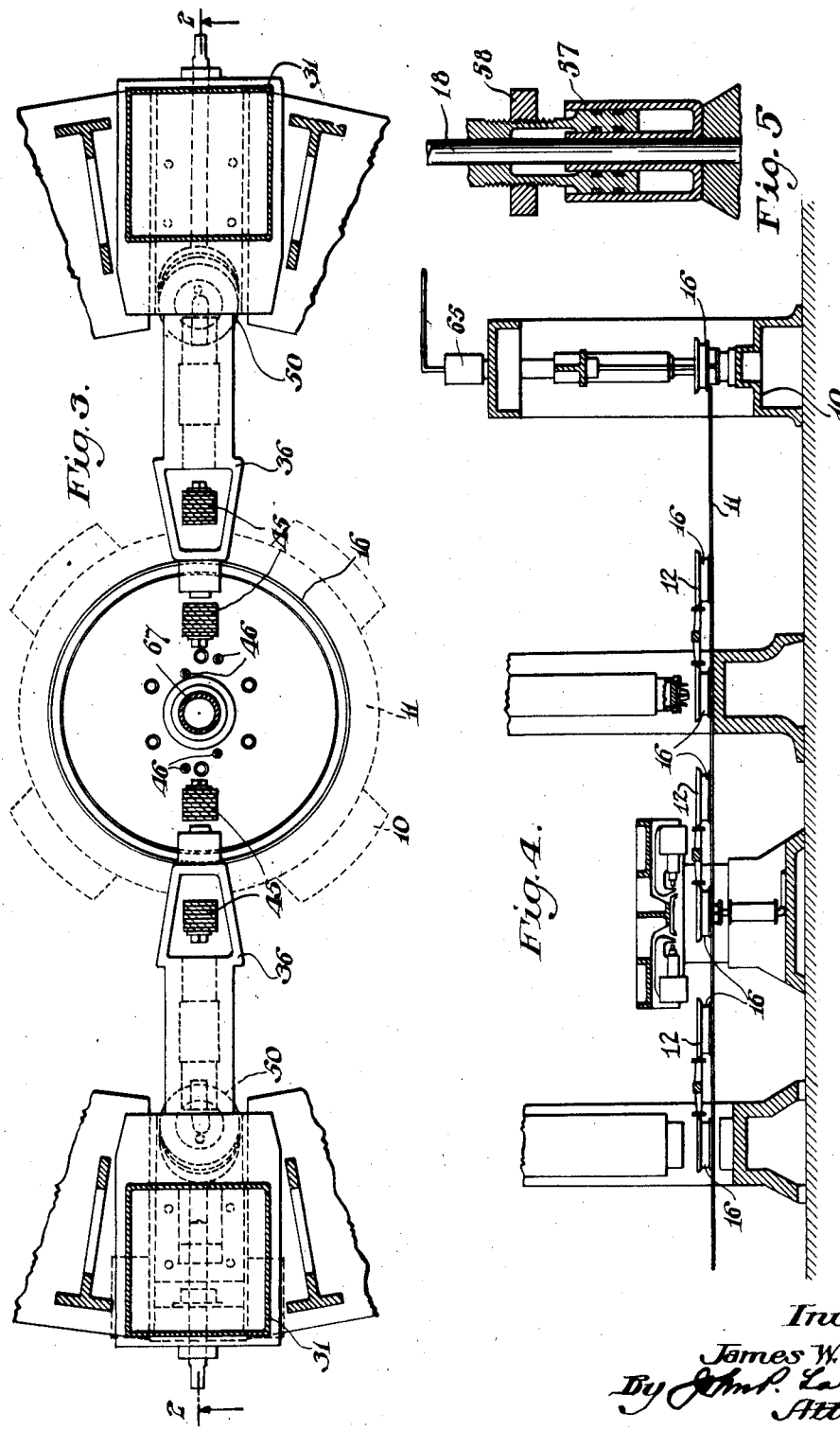
Inventor:
James W. Hughes,
By [signature]
Attorney.

Patented Aug. 4, 1931

1,817,193

UNITED STATES PATENT OFFICE

JAMES W. HUGHES, OF DETROIT, MICHIGAN, ASSIGNOR TO BUDD WHEEL COMPANY, OF PHILADELPHIA, PENNSYLVANIA, A CORPORATION OF PENNSYLVANIA

WHEEL WELDING MACHINE

Application filed January 30, 1928, Serial No. 250,557. Renewed December 17, 1930.

This welding machine was invented primarily to solve the problem of welding wheel rims to wheel discs, of simultaneously making all the welds, and of doing this work as a unit in an automatically operating line of wheel making machinery. This latter phase of my object brings into combination with the welding machine the conveyor of the automatically operating line of wheel making machinery. Such a line is the subject of my copending application, Serial No. 34,743, filed June 3, 1925. Such a line is characterized by coaction of the work conveyor which operates on a determinate path extending from machine to machine of a series, in a peculiar way with each machine of the series, in such manner that the wheel fabrication from raw stock to completed wheel is carried out entirely automatically. This machine constitutes a unit for embodiment in such an automatic line and as such embodies that element common to all other elements of the line, the conveyor.

Other objects of my invention have to do with improvement in the certainty and uniformity of the welds produced by enabling the machine to compensate automatically for minor variations in dimension which are unavoidable in any class of work whatsoever, and particularly unavoidable in rolled and stamped metal products, as are the parts of disc wheels. They have to do further with general radial adjustment for diameters of various sizes. Still further, they have to do with lateral adjustment for differently shaped wheel structures and for rims and disc flanges of different widths, and the like. The general organization of the machine in the interests of simplicity, ease of access, especially to the electrodes which must be kept in good order, supply of power to the electrodes and to the electrode actuating means, the supply of cooling fluid, and many other items have received a coordinating treatment to the ends of ruggedness, durability, low cost of production and operation. And it has been an object to quickly control the plurality and sometimes a large plurality of welding units combined together in this one machine.

In the drawings—

Figure 1 is a general end elevation of the machine.

Figure 2 is a central vertical transverse section on line 2—2 of Fig. 3.

Figure 3 is a partial plan view of the central transverse portion of the machine taken substantially on line 3—3 of Fig. 2.

Figure 4 is a general side elevational view of an automatic line of wheel making machinery in which the present invention is embodied as a unit thereof; and Figure 5 is an enlarged cross-sectional detail of a part of the present invention.

10 represents the conveyor bed of an automatic wheel fabricating line such as I have referred to. 11 are the track-ways of that bed along which are assembled wheel discs and rims, such as those of the wheel 12 illustrated, which are moved step by step by the action of the conveyor. The step by step movement is carried out by transverse arms 13 having a movement of longitudinal reciprocation and engaging the wheels 12 within their central apertures 14 or in any other manner which may be found suitable. The derivation of the step by step movement is clearly explained in the application referred to.

In the wheel 12 illustrated the body of the wheel is constituted by a metal disc. This disc is provided with a flange 15 by means of which it is attached to the rim 16. It is the welding of the flange 15 to the rim 16 with which the particular embodiment of my invention illustrated is concerned.

The welding machine proper comprises a bed 17 arranged transversely of the conveyor bed 10 and track 11. Columns 18 are anchored in this bed on opposite sides of the conveyor and extend upwardly a considerable distance. At their upper ends they are fixedly connected by an upper fixed head 19. Intermediate their ends they carry a vertically reciprocatable transverse head 20 guided in its reciprocatory movement by means of elongated bearings 21 on the columns 18. A reciprocatory movement is produced by connection of the outwardly extended ends 22 of cross head 20 with pitmen 23 reciprocated from cranks 24 on the opposite ends of a transversely extended rotating shaft 25. This shaft is rotated by a spiral gear 26 driven through the train of gears 27 from the longitudinally extending shaft 28 which is the longitudinally extending drive of the automatic wheel fabricating line at large. From this shaft all synchronizations of the machine of the automatic line are controlled. But through clutches 29 the synchronous drive is aided by a synchronous electric motor 30 deriving its electric power from the same source from which that motor which drives the synchronizing shaft 28 derives its power. Shaft 28 likewise is driven by a synchronous motor.

The body of the reciprocatable head 20 is annular in form about the vertically extended axis of the wheel to be operated upon as positioned by the conveyor 10 and 11. On its under side it has fixed to it between the columns 18 a series of transformers 31 arranged annularly about the axis 32 of the wheel and as will be seen of the machine. These transformers have their frames fixedly bolted to the under side of this head and radially arranged on the under sides of these transformer frames are a plurality of radially adjustable electrode supports 33. Screws 34 fixed axially in abutments 35 fixed in position with respect to transformers 31 are threaded into the outer ends of supports 33 in such manner that when the screws are turned, supports 33 are operated radially inwardly or outwardly. Arms 36 from these supports 33 are extended radially inwardly and have their innermost ends extending downwardly toward the conveyor 10—11. At their inner ends they pivotally support each a pair of electrodes 37—38. This support is by means of angle or bell crank levers 39—40, likewise arranged in radial planes, pivotally connected together at 41 for relative movement, scissors-like, and the upper of which 39 is pivotally connected at 42 in turn to the depending lower end of arm 36. The upper arm 39 carries bearing block 43 for the inner electrode 37 while the lower lever 40 carries bearing block 44 for the outer electrode 38. Electrical connections are made with the respective bearing blocks 43—44 by means of flexible leads 45 to the respective transformers 31 located some distance above them. Cooling fluid is supplied to the inner bearing blocks 43 through rubber hose 46 extending axially from manifold 47 carried by head 20. Cooling fluid for the outer bearing blocks 44 is supplied by flexible tubing 48 from surrounding manifolds 49. Operating pressure is derived from hydraulic pistons and cylinders 50 pivotally connected by their stuffing box ends at 51 to the lower bell crank 40 and pivotally connected by their piston rods 52 at 53 to the upper levers 39. They receive hydraulic power by way of flexible conduits 54 and 55. Their manifolds 56 are suspended in common with manifolds 49 from the transformer frames 41 or other fixed part of the machine.

The head 20 and the plurality of welding machines organized and supported therefrom as described is continuously reciprocated by power from shaft 28 and the synchronized motor 30. This movement of reciprocation toward and from the conveyor 10—11 is in substantial synchronism with the step by step movement of the work to be welded, the wheels, along the determinate path of the conveyor, as effected by the feeding arms 13. The relatively great mass so reciprocated is cushioned in its movements by the application of pneumatic hydraulic or combined pneumatic and hydraulic cylinders 57 arranged between the lower ends of the bearings 21 and the bases of the columns 18 in such manner that their cushioning elements are engaged by the lower ends of the journals 21. This cushioning may also be utilized as power storage action in the manner of the Marquette system in common use in die compresses for cushioning and stripping dies.

In conjunction with this cushioning device 57 is arranged an adjustable nut 58 which by its position regulates the degree of approach of head 20 toward bed 17. This is rendered effective by constituting connection 59 of pitmen 23 with the head 20 an adjustable sliding connection. The connection 59 is a rod sliding in the bearing in the outside ends 22 of the head 20 and the mounting of its sliding is controlled by nut 60 on the rod. So the degree of movement of the head 20 and the plurality of welding machines which it carries is regulatable at both ends, at the lower end by the nuts 58, at the upper end by the nuts 60, from a minimum to a maximum defined by the throw of cranks 24.

The manifolds 56 from which the pressure applying cylinders 50 are operated are respectively fed from vertically extended common supply leads 61 projected upwardly into head 20 where they terminate in stuffing boxes 62. Working within stuffing boxes 62 are sliding conduits 63 communicating with wells 64 in the upper fixed head 19. These leads are of sufficient capacity to retain without filling them entirely sufficient liquid to feed all of the cylinders 50 at once on their pressure applying or removing strokes. Air is alternately admitted to the wells 64, of which there are only the two, by a continuously operated valve mechanism 65. This valve mechanism is of a rotary order deriving its rotation from transmission 66 from the spiral gearing or further from continuous rotating shaft of the machine. The arrangement is such that the alternate supply of air pressure to wells 64 is in substantial synchronism with the reciprocation of the welding machines with the head 20. This can be brought about by a one to one ratio between the gear 26 and the shaft 25. This same transmission 66 alternately applies also in substantial synchronism with the movements and controls, the application of electric power of the primaries of the plurality of transformers 31, through switch mechanism 66'.

On the axis 32 of the machine under the head 20 is a depending shaft 67 carrying yieldingly at its lower end a working clamp 68 which when the head 20 is moved toward the conveyor 10—11 engages and fixes the work upon the conveyor or other support.

The operation is as follows: The electrodes 37—38 are adjusted radially by devices 34 which move from supports 33, to gauge properly with the diameter of wheels to be operated upon. This adjustment preferably brings the pivotal points 42 of suspension of the electrodes directly above the parts to be welded together thereby insuring symmetry of movement to the electrodes with respect to the surfaces to be welded. A pre-assembled wheel may be used for effecting this adjustment or it may be effected by appropriate measurements. If the wheel is used, the electrodes are at this time separated by admitting pressure to the upper ends of the cylinders 50 through an appropriate manual control (not shown). Next the electrodes are vertically adjusted to appropriately adjust the line of welds laterally with respect to the rim and the disc flange. This is accomplished by placing cranks 24 at the lower ends of their strokes and appropriate adjusting of nuts 58. Adjustment is rendered more easy by turning the machine over under power, making a given adjustment of nuts 58 and then lowering head 20 as far as the nuts will permit, repeating the operation to make another adjustment if necessary. The up-stroke may then be adjusted if desired by adjustment of nut 60 after the head 20 has been lowered upon nut 58. The machine is then ready to operate in conjunction with the automatic line.

The automatic line being started, a wheel is duly brought into axial coincidence with the axis 32 by the arm 13 of the conveyor 10—11. In synchronism with its reaching this axial position the head 20 is lowered. At this time the electrodes 37—38 are separated due to the synchronous operation of the control valve 65. Upon the reaching of welding position of electrodes 37—38, the synchronously operated valve 65 opens one well 64, that connected with the upper ends of cylinders 50, to atmosphere, and the other well 64, that connected to the lower end of cylinders 50, to line air, whereupon pressure is applied to electrodes 37—38, as indicated in full lines in Fig. 2. This pressure brings the electrodes firmly into contact with the work and the two surfaces to be welded together firmly and contact with each other. At this moment control 66' closes the circuits of the welding transformer 31 effecting the weld. The precise timing and detail of the welding operation is a matter which need not be described since they are largely those of standard practice. On further operation the device 65 reverses the connection of wells 64, reversing the pressure on cylinders 50 and relieving the work of pressure just after the welds have been completed. The electrodes separate. The delay in lost motion of throw of cranks 24 having ended, the further synchronous operation of head 20 raises the electrodes and frees the work therefrom whereupon the synchronous step by step movement through the transverse arms 13 removes the completed work from the range of the electrodes and brings into range and position a piece of uncompleted work.

During the welding operation the welding electrodes and the pressure applying cylinders alike have been floated freely with respect to the work and have adjusted themselves accordingly to all variations in dimension or contour of the work. The relative floating movement about the pivotal points 42 from which the cylinders and electrodes are suspended, is entirely unimpaired. The adjustment of the work can therefore be had with the very greatest degree of accuracy and the certainty and uniformity of the welds is assured.

The attainment and the manner of attainment of the various objects of my invention is so clearly apparent from an understanding of the operation that their individual assignment to specific structure seems to be unnecessary. Suffice it to say that these same objects and advantages with some addition and some subtraction therefrom may be attained in machines greatly modified in structure without in any wise departing from principle and generic spirit. These modifications I desire to cover by the annexed claims as well as the embodiment which I have illustrated and which embodiment is but the best of several already known to me at the present time.

What I claim as new and useful and desire to protect by Letters Patent is:

1. In a welding machine, a work support, means to fix the work on the support, an electrode support adjustable laterally of said work support, and electrodes carried by and having a freely floating movement with respect to said electrode support.

2. In a welding machine, a work support, means to fix the work on the support, an electrode support, and electrodes pivotally carried by the electrode support for engagement with the work, said electrode support being laterally adjustable and axially movable with respect to said work support.

3. In a welding machine, a work support, means to fix the work on the support, an electrode support, electrodes carried thereby and having a freely floating movement with respect to the work, and means for positionally adjusting the electrodes with respect to the work independent of the floating movement aforesaid.

4. In a welding machine, a work support, means to fix the work on the support, an electrode support, and electrodes carried thereby and having a freely floating movement with respect to the work, together with means to apply welding pressure to the electrodes without disturbing the freely floating relation thereof.

5. In a welding machine, a work support, means to fix the work on the support, an electrode support, and a welding unit including a pair of pivotally connected electrodes and pressure applying means therefor, said unit being pivotally supported by said electrode support whereby a freely floating movement of said electrodes with respect to the work is obtained.

6. In a welding machine, a work support, means to fix the work on the support, an electrode support, electrodes and pressure applying means therefor carried by said electrode support as a unit and having a freely floating movement with respect to the work, and means for positionally adjusting said unit laterally of said work.

7. In a welding machine, a work support, means to fix the work on the support, an electrode support laterally adjustable with respect to the work support, and electrodes carried by and floatingly suspended from said electrode support.

8. A welding machine comprising a work support, an electrode support arranged for relative reciprocating movement with respect to said work support, and a pair of cooperating electrodes commonly supported by said electrode support for freely floating engagement with the work.

9. A machine for welding rims to felloes of wheels comprising a wheel support, an electrode support, and a plurality of radially arranged pairs of electrodes simultaneously engageable with the parts to be welded together, each pair of said electrodes having a freely floating engagement with said parts and being adjustable radially thereof.

10. A machine for welding rims to felloes of wheels comprising a wheel support, an electrode support and a plurality of radially arranged pairs of electrodes simultaneously engageable with the work and having each pair a freely floating engagement with the work, together with axial means to fix a wheel on the wheel support, and radially acting means to individually adjust the electrodes to various diameters of wheels.

11. A welding machine comprising in combination a work conveyor arranged to convey the work along on a determinate path, and a welding machine interposed in said path and movable bodily toward and from the determinate conveying path, said machine being automatically operable to perfect the weld simultaneosuly as said work arrives at a predetermined point along said path.

12. A welding machine comprising in combination a welding work conveyor operating in a determinate path, a welding machine bodily reciprocable toward and from said determinate path, said machine including a pair of welding electrodes, and means for effecting operation of said electrodes automatically as said machine moves a predetermined distance toward said path.

13. A welding machine comprising a welding work conveyor operating in a determinate path by a step by step movement, and a welding machine bodily reciprocable toward and from the determinate path in synchronism with the step by step movement, and means for effecting operation of said machine simultaneously as said machine reaches the limit of its movement toward said path.

14. A machine for welding rims to felloes of wheels comprising a wheel conveyor conveying the work in a determinate path, and a plurality of welding machines disposed in general to one side of said path, and means for automatically effecting the simultaneous operation of said machines when the latter approach said path.

15. A welding machine comprising a welding work conveyor operating in a determinate path by a step by step movement, a welding machine bodily reciprocable toward and from the determinate path in synchronism with the step by step movement, said machine including a pair of welding electrodes, and control means also operable in substantial synchronism with the step by step movement of the conveyor for effecting the operation of said electrodes simultaneously as said welding machine and said conveyor approach each other to their closest extent.

16. A welding machine comprising a welding work conveyor and a welding machine, one of which elements is continuously bodily movable toward and from the conveying path and operated in substantial synchronism with said continuous welding machine movement, a pair of electrodes forming part of said welding machine, and means for automatically effecting operation of said electrodes simultaneously as the machine reaches the work to be welded.

17. A welding machine comprising a welding work conveyor operating in a determinate path by a step by step movement, a plurality of welding transformers commonly reciprocable toward and from the determinate path in synchronism with the step by step movement, a pair of electrodes operatively associated with each transformer, and common control means for effecting simultaneous operation of all of said electrodes when said transformers reach the limit of their movement toward said path.

18. A welding machine comprising in combination a welding work conveyor conveying on a determinate path, a welding machine, said conveyor and machine being relatively bodily movable toward and away from each other, a plurality of free floating electrodes carried by the machine and adapted to engage the work when said conveyor and machine move toward each other a predetermined extent, and means to adjust the degree of said relative movement.

19. A welding machine comprising in combination a welding work conveyor conveying on a determinate path, a welding machine one of which elements is bodily movable toward and from the determinate conveying path, a plurality of free floating electrodes carried by the machine and adapted to engage the work when said conveyor and machine approach within a predetermined distance of each other, and a cushion device interposed between the conveyor and the welding machine.

20. A wheel welding machine comprising a wheel support, a laterally disposed radially arranged and relatively axially adjustable annular series of transformers, a pair of pivotally connected electrodes and actuating means therefor associated with each of said transformers, and means to relatively move the wheel support and the annular series of transformers bodily as units whereby to dispose said electrodes in welding position.

21. A wheel welding machine comprising a wheel support, a laterally disposed radially arranged and relatively axially adjustable annular series of transformers, an annular series of electrodes and electrode actuating means associated with said transformers, and means for moving the wheel support as a unit relatively to the annular series of transformer electrodes, the actuating means for said electrodes being movable bodily with said transformers.

In testimony whereof I hereunto affix my signature.

JAMES W. HUGHES.